US008688123B2

(12) United States Patent
Gao et al.

(10) Patent No.: US 8,688,123 B2
(45) Date of Patent: Apr. 1, 2014

(54) METHOD AND SYSTEM FOR A TRANSMITTING MOBILITY STATE

(75) Inventors: Yin Gao, Shenzhen (CN); Lin Liu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/384,476

(22) PCT Filed: Dec. 23, 2009

(86) PCT No.: PCT/CN2009/075910
§ 371 (c)(1),
(2), (4) Date: Jan. 17, 2012

(87) PCT Pub. No.: WO2011/011950
PCT Pub. Date: Feb. 3, 2011

(65) Prior Publication Data
US 2012/0122456 A1   May 17, 2012

(30) Foreign Application Priority Data
Jul. 30, 2009  (CN) .......................... 2009 1 0089976

(51) Int. Cl.
*H04W 36/00*   (2009.01)
(52) U.S. Cl.
USPC ........ 455/436; 455/441; 455/442; 455/456.1; 370/331
(58) Field of Classification Search
CPC .... H04W 28/0226; H04W 36/00; H04W 8/02
USPC ................ 455/436, 441, 442, 456.1; 370/331
See application file for complete search history.

(56) References Cited

U.S. PATENT DOCUMENTS 7,406,063 B2 *  7/2008  Jung et al. ..................... 370/329
8,345,632 B2 *  1/2013  Mildh et al. .................. 370/331

FOREIGN PATENT DOCUMENTS

| CN | 1262587 A | 8/2000 |
| CN | 1599473 A | 3/2005 |
| CN | 101442714 A | 5/2009 |
| JP | 2008078784 A | 4/2008 |

OTHER PUBLICATIONS

International Search Report for PCT/CN2009/075910 dated Apr. 19, 2010.

* cited by examiner

*Primary Examiner* — Nghi H Ly
(74) *Attorney, Agent, or Firm* — Ling Wu; Stephen Yang; Ling and Yang Intellectual Property LLC

(57) ABSTRACT

A method for transmitting a mobility state is provided in the present invention, the method includes: when an source evolved NodeB (eNB) performs a handover of a user equipment (UE) in a connectivity state, it sends the UE historical information to a target eNB; the target eNB decides a mobility state of the UE according to the UE historical information. Alternatively, when the source eNB performs a handover of the UE in a connectivity state, it decides the mobility state of the UE according to the UE historical information, sets the corresponding mobility state instruction information and sends it to the target eNB; the target eNB acquires the mobility state corresponding to the UE according to the received mobility state instruction information. A system for transmitting a mobility state is also provided in the present invention.

6 Claims, 3 Drawing Sheets

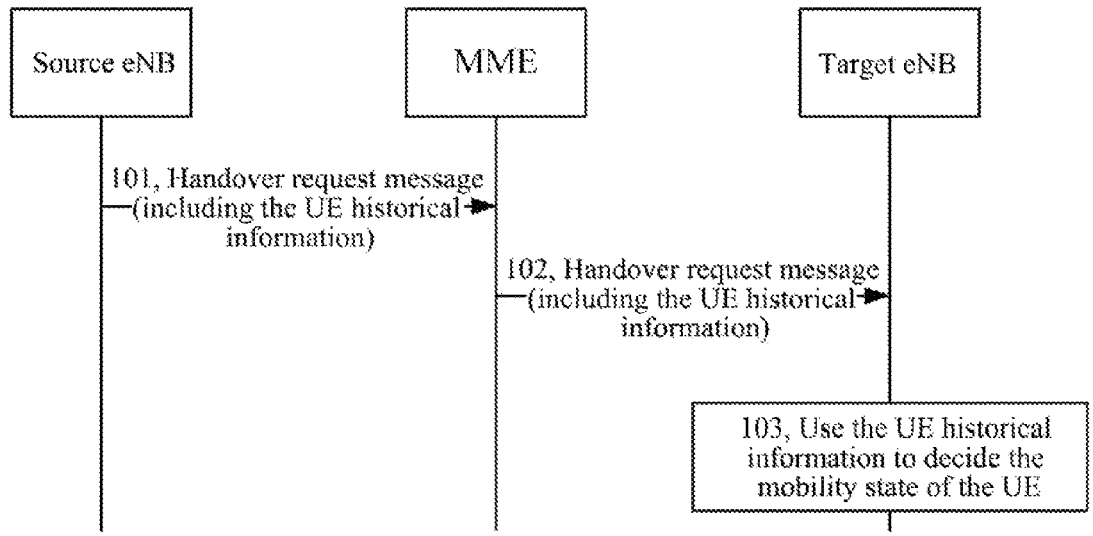

FIG. 1

| element name | Range |
|---|---|
| The number of the recently visited cells | 1~the maximum number of the historical cells, such as defined as 16 |
| The list information of the recently visited cells | Sort in order, the latest visited cell is in the most front of the list |
| the E-UTRAN cell information | Including the cell global ID, the cell type and the residence time |
| the UTRAN cell information | Including the cell global ID (PLMN ID + CELL ID), the cell type and the residence time |
| GERAN cell information | Including the cell global ID, the cell type and the residence time |

FIG. 2

METHOD AND SYSTEM FOR A TRANSMITTING MOBILITY STATE

TECHNICAL FIELD

The present invention relates to the field of wireless cellular communication technology, and more especially, to a method and a system for transmitting a mobility state.

BACKGROUND OF THE RELATED ART

The Long Term Evolution (LTE) network composes of Evolved Universal Terrestrial Radio Access (E-UTRAN) Evolved NodeBs (eNB) and Evolved Packet Cores (EPC), and the network is flatted. The E-UTRAN contains a set of eNBs that connect with the EPC via the interface S1, and the eNBs are connected with each other via the X2, where the S1 and the X2 are logical interfaces. One EPC might manage one or more eNBs, and one eNB might also be controlled by a plurality of EPCs, and one eNB might manage one or more cells. The LTE-Advanced (LTE-A) system is evolved from the LTE system, and its network architecture is consistent with the LTE.

The current protocol defines the criterion for a User Equipment (UE) in the idle state deciding its own mobility state as well as the transformation relationship among the mobility states, and the specific description is as follows:

if the number of the times for the UE re-selecting the cell in the time period of TCR max is greater than the lower limit of the number NCR_M, while less than or equal to the upper limit of the number NCR_H, it is considered that the UE is in the medium-speed mobility state;

if the number of the times for the UE re-selecting the cell in the time period of TCR max is greater than NCR_H, it is considered that the UE is in the high-speed mobility state;

if the number of the times for the UE re-selecting the cell within the time period of TCRmaxHyst is less than or equal to NCR_M, it is considered that the UE is in the normal mobility state.

The UE detects the number of its own cell re-selections, if it meets the decision criterion of the high-speed mobility state, the UE enters into the high-speed mobility state; if it meets the decision criterion of the medium-speed mobility state, the UE enters into the medium-speed mobility state; if it does not meet the decision criterion of the high-speed mobility state or the medium-speed mobility state, the UE enters into the normal mobility state.

Usually, the mobility state of the UE is uncertain, the movement trajectory of the UE at a given moment is temporary and abrupt, for a UE in the connectivity state however, the current mobility state of the UE can be deduced according to the statistical data of the previous movement trajectory in the service keeping period. In the LTE/LTE-A system, the mobility state of the UE is not only associated with the normal handoff decision optimization, and likewise, under the load balancing optimization in the scenario of the self-organization network (SON), for a to-be-balanced UE, if the current mobility state of the UE can be decided, the current mobility state of the UE can be as a reference for the UE selecting an appropriate target cell to hand over, for example: for a user whose mobility state is the high-speed mobility state, a macro cell rather than a micro cell for the user might be selected, which is beneficial to user service continuity and improves the degree of satisfaction of the customer.

However, when the UE is in the connectivity state, how to decide the mobility state of the UE and to make the target eNB to acquire the mobility state of the UE, is a problem to be solved.

SUMMARY OF THE INVENTION

In view of this, the main purpose of the present invention is to provide a method and a system for transmitting a mobility state so as to decide a mobility state of a UE and to make a target eNB acquire the mobility state of the UE.

To achieve this, the technical scheme of the present invention is implemented as:

the present invention provides a method for transmitting a mobility state, the method comprising:

a source evolved NodeB (eNB) sending the UE historical information to a target eNB when performing a handover of a user equipment (UE) in a connectivity state;

the target eNB deciding the mobility state of the UE according to the UE historical information.

The UE historical information comprises: the number of cells recently visited by the UE, the list information of the cells recently visited by the UE, the Evolved Universal Terrestrial Radio Access (E-UTRAN) cell information, the UTRAN cell information and global system for mobile communications (GSM)/Enhanced Data Rate GSM Evolution (EDGE) Radio Access Network (GERAN) cell information.

Said deciding the mobility state of the UE based on the UE historical information is specifically:

collecting the number of all the visited cells in the UE historical information in the decision time period, starting to collect from the latest visited cell, and adding the residence time in the visited cell to acquire the $T_{sum}$, and the number of the cells $N_{sum}$ is added by 1, when the $T_{sum}$ is greater than or equal to the preset decision time window T, stopping adding the $N_{sum}$, and comparing the current $N_{sum}$ with the number of the cells in the normal mobility state $N_{normal}$, the number of the cells in the medium-speed mobility state $N_{middle}$ and the number of the cells in the high-speed mobility state $N_{high}$;

if $N_{sum}<=N_{normal}$, deciding that the mobility state of the UE is the normal mobility state;

if $N_{normal}<N_{sum}<=N_{middle}$, deciding that the mobility state of the UE is the medium-speed mobility state;

if $N_{normal}<N_{sum}<N_{high}$, deciding that the mobility state of the UE is the high-speed mobility state;

when the handover is an S1 handover, the method further comprises:

the source eNB sending a handover request message carrying the UE historical information to the target eNB via a mobility management entity (MME);

the target eNB extracting the UE historical information from the handover request message, and deciding the mobility state of the UE according to the UE historical information.

When the handover is an X2 handover, the method further comprises:

the source eNB sending a handover request message carrying the UE historical information to the target eNB;

the target eNB extracting the UE historical information from the handover request message, and deciding the mobility state of the UE according to the UE historical information.

The present invention also provides a method for transmitting a mobility state, the method comprises:

the source eNB deciding the mobility state of the UE according to the UE historical information when performing a handover of the UE in a connectivity state, and setting the corresponding mobility state instruction information to send to the target eNB;

the target eNB acquiring the mobility state corresponding to the UE according to the received mobility state instruction information.

the UE historical information comprises: the number of cells recently visited by the UE, the list information of the cells recently visited by the UE, the E-UTRAN cell information, the UTRAN cell information and the GERAN cell information.

Said deciding the mobility state of the UE based on the UE historical information is specifically:

collecting the number of all the visited cells in the UE historical information in the decision time period, starting to collect from the latest visited cell, and adding the residence time in the visited cell to acquire the $T_{sum}$, and the number of the cells $N_{sum}$ is added by 1, when the $T_{sum}$ is greater than or equal to the preset decision time window T, stopping adding the $N_{sum}$, and comparing the current $N_{sum}$ with the preset $N_{normal}$, $N_{middle}$ and $N_{high}$;

if $N_{sum}<=N_{normal}$, deciding that the mobility state of the UE is the normal mobility state;

if $N_{normal}<N_{sum}<=N_{middle}$, deciding that the mobility state of the UE is the medium-speed mobility state;

if $N_{normal}<N_{sum}<=N_{high}$, deciding that the mobility state of the UE is the high-speed mobility state.

When the handover is an S1 handover, the method further comprises:

the source eNB carrying the UE historical information in a handover request message and sending the handover request message to a mobility management entity (MME), and the MME forwarding the handover request message to the target eNB;

the target eNB acquiring the mobility state corresponding to the UE according to the mobility state instruction information in the handover request message.

When the handover is an X2 handover, the method further comprises:

the source eNB carrying the mobility state instruction information in a handover request message to send to the target eNB;

the target eNB acquiring the mobility state corresponding to the UE according to the mobility state instruction information in the handover request message.

The present invention also provides a system for transmitting a mobility state, the system comprises: a source eNB and a target eNB, wherein, the source eNB is used to send the UE historical information to the target eNB when performing a handover of the UE in the connectivity state;

the target eNB is used to decide the mobility state of the UE according to the UE historical information.

The UE historical information comprises: the number of cells recently visited by the UE, the list information of the cells recently visited by the UE, the E-UTRAN cell information, the UTRAN cell information and the GERAN cell information.

The target eNB is further used to: collect the number of all the visited cells in the UE historical information in the decision time period, start to collect from the latest visited cell, and add the residence time in the visited cell to acquire the $T_{sum}$, and add the number of the times cells $N_{sum}$ by 1, when the $T_{sum}$ is greater than or equal to the preset decision time window T, stop adding the $N_{sum}$, and compare the current $N_{sum}$ with the number of the cells in the normal mobility state $N_{normal}$, the number of the cells in the medium-speed mobility state $N_{middle}$ and the number of the cells in the high-speed mobility state $N_{high}$;

if $N_{sum}<=N_{normal}$, decide that the mobility state of the UE is the normal mobility state;

if $N_{normal}<N_{sum}<=N_{middle}$ decide that the mobility state of the UE is the medium-speed mobility state;

if $N_{middle}<N_{sum}<=N_{high}$, decide that the mobility state of the UE is the high-speed mobility state.

When the handover is an X2 handover, the source eNB is further used to carry the UE historical information in a handover request message to send to the target eNB;

When the handover is an S1 handover, the system further comprises an MME, correspondingly, the source eNB is further used to carry the UE historical information in a handover request message to send to the MME;

the MME is used to forward the handover request message carrying the UE historical information to the target eNB.

The present invention also provides a system for transmitting a mobility state, the system comprises: a source eNB and a target eNB, wherein, the source eNB is used to decide the mobility state of the UE according to the UE historical information when performing a handover of the UE in the connectivity state, and to set the corresponding mobility state instruction information to send to the target eNB;

the target eNB is used to acquire the mobility state of the UE according to the received mobility state instruction information.

The UE historical information comprises: the number of cells recently visited by the UE, the list information of the cells recently visited by the UE, the E-UTRAN cell information, the UTRAN cell information and the GERAN cell information.

The source eNB is further used to: collect the number of all the visited cells in the UE historical information in the decision time period, start to collect from the latest visited cell, and add the residence time in the visited cell to acquire the $T_{sum}$, and add the number of the times cells $N_{sum}$ by 1, when the $T_{sum}$ is greater than or equal to the preset decision time window T, stop adding the $N_{normal}$, and compare the $N_{sum}$ with the number of the cells in the normal mobility state $N_{normal}$, the number of the cells in the medium-speed mobility state $N_{middle}$ and the number of the cells in the high-speed mobility state $N_{high}$;

if $N_{sum}<=N_{normal}$, decide that the mobility state of the UE is the normal mobility state;

if $N_{normal}<N_{sum}<=N_{middle}$ decide that the mobility state of the UE is the medium-speed mobility state;

if $N_{middle}<N_{sum}<=N_{high}$, decide that the mobility state of the UE is the high-speed mobility state.

When the handover is an X2 handover, the source eNB is further used to: carry the UE historical information in a handover request message to send to the target eNB.

When the handover is an S1 handover, the system further comprises an MME, correspondingly, the source eNB is further used to carry the UE historical information in a handover request message to send to the MME;

the MME is used to forward the handover request message carrying the UE historical information to the target eNB.

In the method and system for transmitting a mobility state provided in the present invention, the source eNB decides the mobility state of a UE in the connectivity state based on the UE historical information and sends it to the target eNB, alternatively, the target eNB decides the mobility state of the UE in the connectivity state according to the UE historical information sent from the source eNB. With the method for deciding the mobility state of the UE based on the UE historical information, the present invention makes the source eNB/target eNB timely informed of the mobility state of the UE, which plays a significant role in improving the handover success rate and reducing unnecessary handovers, moreover, maintaining the user service continuity in the handover process and improving the degree of customer satisfaction.

BRIEF DESCRIPTION OF DRAWINGS

FIG. 1 is the flow chart of a method for transmitting a mobility state in accordance with the first embodiment of the present invention;

FIG. 2 is a structural diagram of the UE historical information in the present invention.

PREFERRED EMBODIMENTS OF THE PRESENT INVENTION

Figure 3:
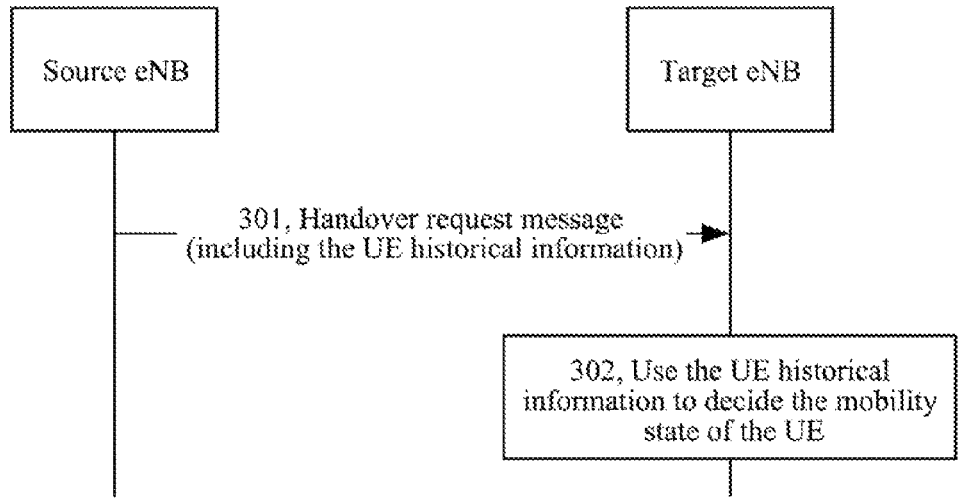
FIG. 3 is the flow chart of a method for transmitting a mobility state in accordance with the second embodiment of the present invention.

The technical scheme of the present invention will be illustrated in further detail with the combination of the accompanying drawings and specific embodiments.

To make the target eNB timely informed of the mobility state of the UE and further performs the corresponding handover and acceptance according to the mobility state of the UE, the present invention proposes the following method: the source eNB decides the mobility state of the UE according to the UE Historical information and sends the mobility state of the UE to the target eNB when the source eNB performs a handover of the UE in the connectivity state; alternatively, the source eNB sends the UE historical information to the target eNB when performing a handover of the UE in the connectivity state, and the target eNB decides the mobility state of the UE in the connectivity state according to the UE historical information.

In the following, an embodiment of the target eNB deciding the mobility state of the UE in the connectivity state according to the UE historical information sent from the source eNB will be described in detail.

For the S1 handover, the specific method for transmitting a mobility state is shown as the first embodiment shown in FIG. 1, mainly comprising the following steps:

step 101, the source eNB sends a handover request message to the MME, the message contains the UE historical information.

the structure of the UE historical information is shown as FIG. 2, comprising: the information of the historical cells in which the UE was located before it hands over to the target cell, the information only includes the historical information record in one connectivity state, specifically comprising the number of the cells recently visited by the UE and the list information of the cells recently visited by the UE; the UE historical information also comprises: the E-UTRAN cell information, the UTRAN cell information and the global system for mobile communications (GSM)/Enhanced Data Rate for GSM Evolution (EDGE) Radio Access Network (GERAN) cell information. The E-UTRAN cell information, the UTRAN cell information and the GERAN cell information are sorted according to their time order, and the latest cell record is in the most front of the list, and the cell information specifically comprises the cell global ID, the cell type and the residence time.

Step 102, the MME forwards the received handover request message including the UE historical information to the target eNB.

Step 103, the target eNB extracts the UE historical information from the received handover request message, and decides the mobility state of the UE according to the UE historical information.

The specific operation is: collecting the number of all the cells visited in the UE historical information in the decision time period, starting to collect from the latest visited cell, and adding the residence time in the visited cell to acquire the $T_{sum}$, and increasing the number of cells $N_{sum}$ by 1, when the $T_{sum}$ is greater than or equal to the preset decision time window T, stopping adding the $N_{sum}$, and comparing the $N_{sum}$ with the number of cells in the normal mobility state $N_{normal}$, the number of cells in the medium-speed mobility state $N_{middle}$ and the number of cells in the high-speed mobility state $N_{high}$;

if $N_{sum}<=N_{normal}$, deciding that the mobility state of the UE is the normal mobility state;

if $N_{normal}<N_{sum}<=N_{middle}$, deciding that the mobility state of the UE is the medium-speed mobility state;

if $N_{normal}<N_{sum}<=N_{high}$, deciding that the mobility state of the UE is the high-speed mobility state.

Deciding that the time window T might be set in the background or within the algorithm, the $N_{normal}$, $N_{middle}$ and $N_{high}$ might be set in the background or set according to the network empirical value.

After the target eNB acquires the mobility state of the UE, it takes the mobility state of the UE as one basis in the current handover and acceptance decision, and if the current target cell is adaptable to the mobility state of the UE, accepts the UE, otherwise rejects the UE.

For the X2 handover, the specific method for transmitting a mobility state is shown as the second embodiment in FIG. 3, mainly comprising the following steps:

step 301, the source eNB directly sends a handover request message to the target eNB, and the message contains the UE historical information.

Step 302, the target eNB extracts the UE historical information from the received handover request message, and decides the mobility state of the UE based on the UE historical information.

the specific operation of deciding the mobility state of the UE is the same as that in the first embodiment shown in FIG. 1 and is not repeated here.

To achieve the method for transmitting a mobility state in the aforementioned first and second embodiments, the present invention also provides a system for transmitting a mobile state, comprising: a source eNB and a target eNB. The source eNB is used to send the UE historical information to the target eNB when performing a handover of the UE in the connectivity state, and to send the UE historical information to the target eNB. The target eNB is used to decide the mobility state of the UE according to the UE historical information.

For the X2 handover, the source eNB is further used to carry the UE historical information in a handover request message and send it to the target eNB.

For the S1 handover, the system further comprises a MME, correspondingly, the source eNB is further used to carry the UE historical information in a handover request message and send it to the MME; the MME is used to forward the handover request message carrying the UE historical information to the target eNB.

In the following, an embodiment of the source eNB deciding the mobility state of a UE in the connectivity state according to the UE historical information and sending the mobility state of the UE to the source eNB will be described in detail.

Figure 4:
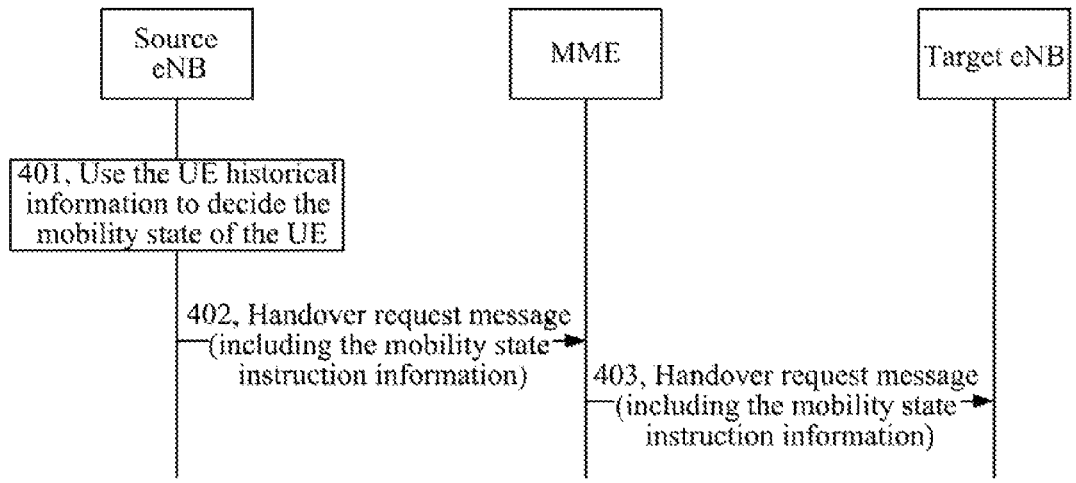
FIG. 4 is the flow chart of a method for transmitting a mobility state in accordance with the third embodiment of the present invention.

For the S1 handover, the specific method for transmitting a mobility state is shown as the third embodiment shown in FIG. 4, mainly comprising the following steps:

step 401, the source eNB decides the mobility state of the UE that currently needs to hand over according to the UE historical information when performing a handover of the UE in the connectivity state.

the specific operation of deciding the mobility state of the UE is the same as that in the first embodiment shown in FIG. 1 and is not repeated here.

Step 402, the source eNB constructs a handover request message, adds the UE mobility state instruction information into the message, and sends the handover request message carrying the UE mobility state instruction information to the MME.

The handover request message is the enumeration type, including the normal mobility state, the medium-speed mobility state and the high-speed mobility state. The UE mobility state instruction information is set based on the decided mobility state of the UE.

Step 403, the MME forwards the received handover request message to the target eNB, the target eNB extracts the UE mobility state instruction information from the received handover request message and acquires the mobility state corresponding to the UE.

After the target eNB acquires the mobility state of the UE, it takes the mobility state of the UE as one basis in the current handover and acceptance decision, if the current target cell is adaptable to the mobility state of the UE, accepts the UE, otherwise rejects the UE.

Figure 5:
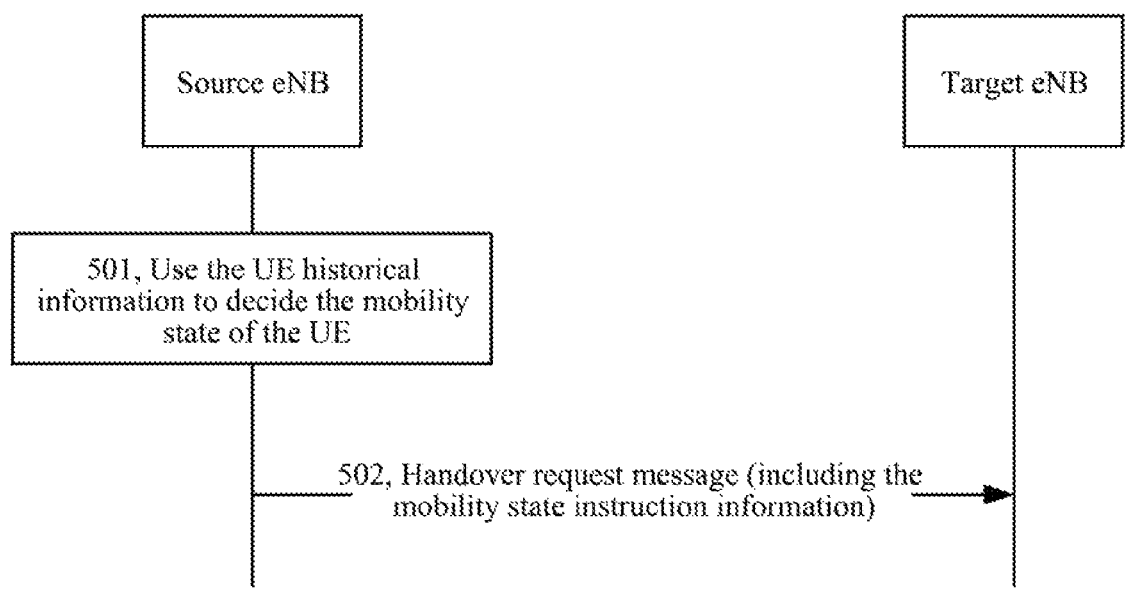
FIG. 5 is the flow chart of a method for transmitting a mobility state in accordance with the fourth embodiment of the present invention.

For the X2 handover, the specific method for transmitting a mobility state is shown as the fourth embodiment in FIG. 5, mainly comprising the following steps:

step 501, the source eNB decides the mobility state of the UE that currently needs to hand over according to the UE historical information when performing a handover of the UE in the connectivity state.

the specific operation of deciding the mobility state of the UE is the same as that in the first embodiment shown in FIG. 1 and is not repeated here.

Step 502, the source eNB directly sends the received handover request message to the target eNB, the target eNB extracts the UE mobility state instruction information from the handover request message and acquires the mobility state corresponding to the UE.

To achieve the method for transmitting a mobility state in the aforementioned third and fourth embodiments, the present invention also provides a system for transmitting a mobile state, comprising: a source eNB and a target eNB. The source eNB is used to decide the mobility state of the UE according to the UE historical information when performing a handover of the UE in the connectivity state, and sets the corresponding mobility state instruction information to send to the target eNB. The target eNB is used to acquire the mobility state corresponding to the UE according to the received mobility state instruction information.

For the X2 handover, the source eNB is further used to carry the mobility state instruction information in the handover request message and send it to the target eNB.

For the S1 handover, the system further comprises a MME, correspondingly, the source eNB is further used to carry the mobility state instruction information in the handover request message and send it to the MME; the MME is used to forward the handover request message carrying the mobility state instruction information to the target eNB.

In summary, the mode of the present invention deciding the mobility state of the UE based on the UE historical information makes the source eNB/target eNB timely informed of the mobility state of the UE, which plays a significant role in improving the handover success rate and reducing unnecessary handovers, meanwhile, it also helps to keep the user service continuity and to improve the degree of customer satisfaction during the handover process.

The above description is only the preferred embodiments of the present invention, and is not intended to limit the present invention.

What is claimed is:

1. A method for transmitting a mobility state, comprising:
   when performing a handover of a user equipment (UE) in connectivity state from a source evolved NodeB (eNB) to a target eNB, the source eNB or the target eNB deciding the mobility state of the UE which indicates a speed level of the UE according to UE historical information in a service keeping period;
   wherein when the handover is an S1 handover, S1 being a logical interface between an Evolved Packet Core (EPC) and an eNB:
      the source eNB sends a handover request message carrying the UE historical information to the target eNB via a mobility management entity (MME), and the target eNB extracts the UE historical information from the handover request message, and decides the mobility state of the UE according to the UE historical information; or
      the source eNB decides the mobility state of the UE according to the UE historical information, and carries corresponding mobility state instruction information in the handover request message to send to the MME, the MME forwards the handover request message to the target eNB, and the target eNB acquires the mobility state corresponding to the UE according to the mobility state instruction information in the handover request message;
   when the handover is an X2 handover, X2 being a logical interface between eNBs:
      the source eNB sends the handover request message carrying the UE historical information to the target eNB, and the target eNB extracts the UE historical information from the handover request message, and decides the mobility state of the UE according to the UE historical information; or
      the source eNB decides the mobility state of the UE according to the UE historical information, and carries the corresponding mobility state instruction information in the handover request message to send to the target eNB, and the target eNB acquires the mobility state corresponding to the UE according to the mobility state instruction information in the handover request message.

2. The method for transmitting a mobility state of claim 1, wherein, the UE historical information comprises: a number of cells recently visited by the UE, list information of the cells recently visited by the UE, Evolved Universal Terrestrial Radio Access (E-UTRAN) cell information, Universal Terrestrial Radio Access (UTRAN) cell information and global system for mobile communications (GSM)/Enhanced Data Rate GSM Evolution (EDGE) Radio Access Network (GE-RAN) cell information.

3. The method for transmitting a mobility state of claim 1, wherein, said deciding the mobility state of the UE based on the UE historical information is specifically:

collecting the number of all the cells visited in the UE historical information in a decision time period, starting to collect from a latest visited cell, and accumulating residence time in the visited cells in turn to acquire $T_{sum}$, and accumulating the number of the cells $N_{sum}$ by 1 in turn, when the $T_{sum}$ is greater than or equal to a set decision time window T, stopping the accumulation of the $N_{sum}$, and comparing the current $N_{sum}$ with a set number of cells in a normal mobility state $N_{normal}$, a set number of cells in a medium-speed mobility state $N_{middle}$ and a set number of cells in a high-speed mobility state $N_{high}$;

if $N_{sum} <= N_{normal}$, deciding that the mobility state of the UE is the normal mobility state;

if $N_{normal} < N_{sum} <= N_{middle}$, deciding that the mobility state of the UE is the medium-speed mobility state;

if $N_{middle} < N_{sum} <= N_{high}$, deciding that the mobility state of the UE is the high-speed mobility state.

4. A system for transmitting a mobility state, comprising: a source evolved NodeB (eNB) and a target eNB, wherein, the source eNB or the target eNB is configured to, when performing a handover of a user equipment (UE) in connectivity state from the source eNB to the target eNB, decide the mobility state of the UE which indicates a speed level of the UE according to UE historical information in a service keeping period;

wherein when the handover is an S1 handover, S1 being a logical interface between an Evolved Packet Core (EPC) and an eNB:

the source eNB is configured to send a handover request message carrying the UE historical information to the target eNB via a mobility management entity (MME), and the target eNB is configured to extract the UE historical information from the handover request message, and decide the mobility state of the UE according to the UE historical information; or the source eNB is configured to decide the mobility state of the UE according to the UE historical information, and carry corresponding mobility state instruction information in the handover request message to send to the MME, and after the MME forwards the handover request message to the target eNB, the target eNB is configured to acquire the mobility state corresponding to the UE according to the mobility state instruction information in the handover request message;

when the handover is an X2 handover, X2 being a logical interface between eNBs:

the source eNB is configured to send the handover request message carrying the UE historical information to the target eNB, and the target eNB is configured to extract the UE historical information from the handover request message, and decide the mobility state of the UE according to the UE historical information; or the source eNB is configured to decide the mobility state of the UE according to the UE historical information, and carry the corresponding mobility state instruction information in the handover request message to send to the target eNB, and the target eNB is configured to acquire the mobility state corresponding to the UE according to the mobility state instruction information in the handover request message.

5. The system for transmitting a mobility state of claim 4, wherein, the UE historical information comprises: a number of cells recently visited by the UE, list information of the cells recently visited by the UE, Evolved Universal Terrestrial Radio Access (E-UTRAN) cell information, Universal Terrestrial Radio Access (UTRAN) cell information and global system for mobile communications (GSM)/Enhanced Data Rate GSM Evolution (EDGE) Radio Access Network (GE-RAN) cell information.

6. The system for transmitting a mobility state of claim 4, wherein, the target eNB is further configured to: collect the number of all the cells visited in the UE historical information in a decision time period, start to collect from a latest visited cell, and accumulate residence time in the visited cells in turn to acquire $T_{sum}$, and accumulate the number of the cells $N_{sum}$ by 1 in turn, when the $T_{sum}$ is greater than or equal to a set decision time window T, stop the accumulation of the $N_{sum}$, and compare the current $N_{sum}$ with a set number of cells in a normal mobility state $N_{normal}$, a set number of cells in a medium-speed mobility state $N_{middle}$ and a set number of cells in a high-speed mobility state $N_{high}$;

if $N_{sum} <= N_{normal}$, decide that the mobility state of the UE is the normal mobility state;

if $N_{normal} < N_{sum} <= N_{middle}$, decide that the mobility state of the UE is the medium-speed mobility state;

if $N_{middle} < N_{sum} <= N_{high}$, decide that the mobility state of the UE is the high-speed mobility state.

* * * * *